C. O. BRANDELL.
DEVICE FOR FORMING AND BAKING FOOD PRODUCTS.
APPLICATION FILED APR. 8, 1913.

1,118,182.

Patented Nov. 24, 1914.
8 SHEETS—SHEET 2.

FIG. 2.

WITNESSES:
C. W. Huffman
Hugo W. Kreinbring

INVENTOR
Claus O. Brandell.
BY Edward N. Pagelsen.
ATTORNEY

C. O. BRANDELL.
DEVICE FOR FORMING AND BAKING FOOD PRODUCTS.
APPLICATION FILED APR. 8, 1913.

1,118,182.

Patented Nov. 24, 1914.
8 SHEETS—SHEET 6.

FIG. 6.

WITNESSES:

INVENTOR
Claus O. Brandell.
BY
Edward N. Pagelsen.
ATTORNEY

C. O. BRANDELL.
DEVICE FOR FORMING AND BAKING FOOD PRODUCTS.
APPLICATION FILED APR. 8, 1913.

1,118,182.

Patented Nov. 24, 1914.
8 SHEETS—SHEET 7.

FIG. 7.

WITNESSES:
C. W. Huffman.
Hugo W. Kreinbring

INVENTOR
Claus O. Brandell
BY
Edward N. Pagelsen
ATTORNEY

C. O. BRANDELL.
DEVICE FOR FORMING AND BAKING FOOD PRODUCTS.
APPLICATION FILED APR. 8, 1913.

1,118,182.

Patented Nov. 24, 1914.
8 SHEETS—SHEET 8.

WITNESSES:
C. M. Huffman.
Hugo W. Kreinbring

INVENTOR
Claus O. Brandell.
BY
Edward N. Pagelsen.
ATTORNEY

UNITED STATES PATENT OFFICE.

CLAUS O. BRANDELL, OF SOUTH BEND, INDIANA.

DEVICE FOR FORMING AND BAKING FOOD PRODUCTS.

1,118,182.   Specification of Letters Patent.   Patented Nov. 24, 1914.

Application filed April 8, 1913. Serial No. 759,587.

*To all whom it may concern:*

Be it known that I, CLAUS O. BRANDELL, a citizen of the United States, and a resident of South Bend, in the county of St. Joseph and State of Indiana, have invented a new and Improved Device for Forming and Baking Food Products, of which the following is a specification.

This invention relates to means for forming and baking stems, pencils, or rods of dough and then breaking them into short lengths, and its object is to provide a food producing device which shall be simple and effective, which shall require little care, and which shall have a large output.

This invention consists of a plurality of cylinders for properly prepared dough and having small holes in one end, a piston for each cylinder and means to operate the piston to force the dough out of these holes, together with a movable carrier and an oven in which the carrier is mounted.

This invention also consists in building the carrier in the form of a drum formed of narrow transverse plates having sharp outer edges on which the stems, pencils or rods of dough will lie and be indented, so that after being baked they will break readily into proper lengths.

This invention further consists in the various details of construction illustrated in the accompanying drawings and particularly pointed out in the claims.

In the accompanying drawings

Similar reference characters refer to like parts throughout the several views.

In the present machine, dough is placed in cylinders having perforated ends. Pistons are pressed into these cylinders so that the dough will be forced out of the perforations in the form of stems, rods or pencils. A movable carrier receives these pencils of soft dough and supports them while they pass through a zone of sufficient heat to bake the dough, after which the pencils are broken up into short lengths or kernels. The mechanism therefore consists of two parts, a device for forming, supporting and breaking up the pencils of dough, and an oven.

Figure 3:
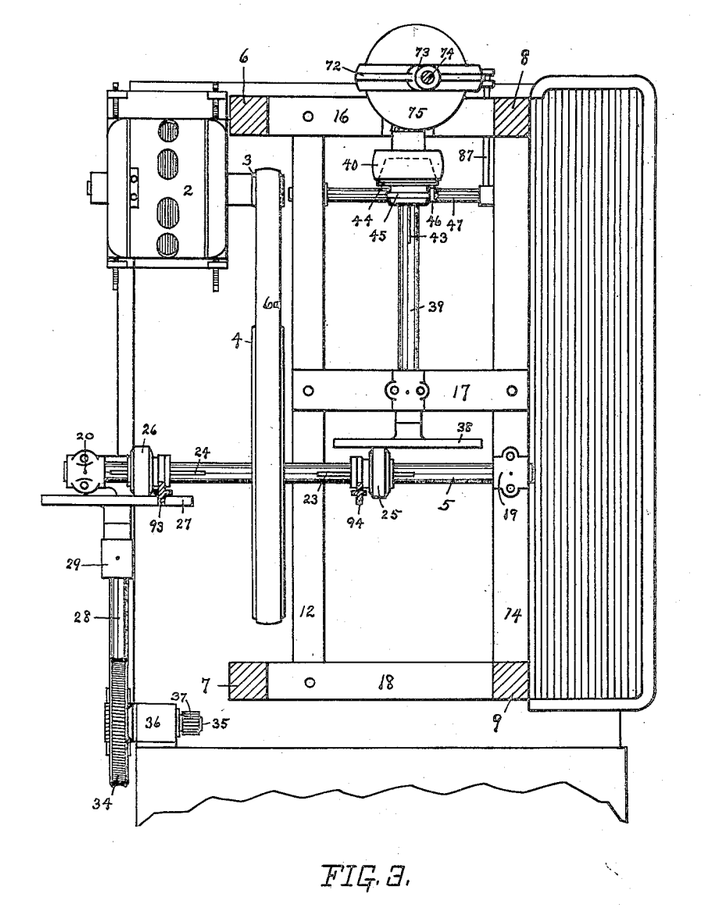
Fig. 3 is a section on the line 3—3 of Fig. 1.

The longitudinal sills 1 are preferably steel beams and support the frames and pedestals for the operating mechanism and the oven. At the front end of one sill may be mounted a motor 2 having a pulley 3 that connects to the pulley 4 on the main shaft 5 by means of a belt $6^a$, although any other desired means may be employed to drive this shaft. Legs 6, 7, 8 and 9 support the longitudinal bars 11, 12, 13 and 14, and the cross-bars 15, 16, 17 and 18. The shaft 5 is mounted in a bearing 19 on the longitudinal bar 14 and in the bearing 20 at the upper end of the pedestal 21. See Fig. 3.

Figure 1:
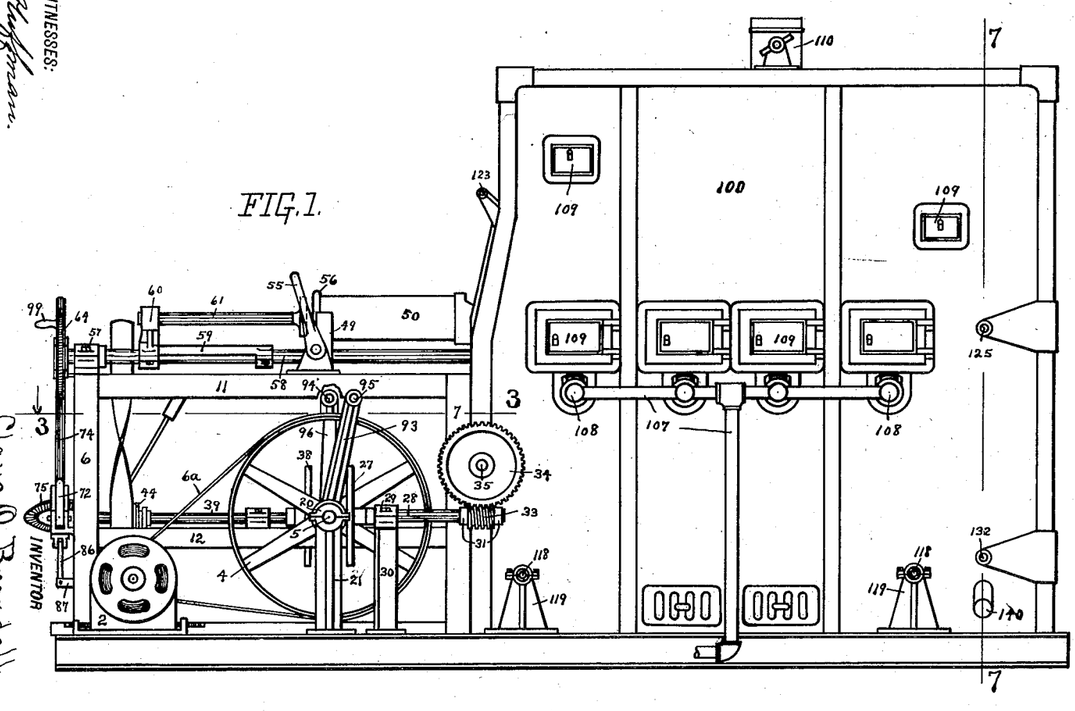
Figure 1 is a right side elevation of the complete machine.

The shaft 5 has feathers or splines 23 and 24, over which the friction wheels 25 and 26 are slidable, and by which they are driven. The friction wheel 26 engages the disk 27 on the shaft 28, as shown in Fig. 1, which shaft is mounted in the bearing 29 at the upper end of the pedestal 30, and bearings 31 projecting from the oven. See Fig. 1. On the shaft 28 is a worm 33 which meshes with a worm gear 34 on the shaft 35, which shaft is journaled in a bearing 36 just within the oven, and also has a pinion 37 at its inner end. See Fig. 3.

The friction wheel 25 engages the disk 38 secured on the shaft 39, which shaft is mounted in bearings on the cross-bars 16 and 17 and also carries the pulley 40 and bevel pinion 41, the latter secured to the shaft. This shaft also has a feather or spline 43 on which the clutch-cone 44 is slidable into and out of the tapering chamber of the pulley 40. A ring 45 on the hub of the cone is engaged by the lever 46 on the shaft 47.

Figure 8:
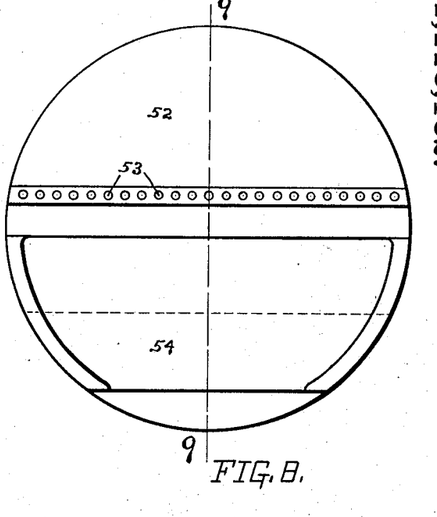
Fig. 8 is a rear elevation of a cylinder.
Figure 9:
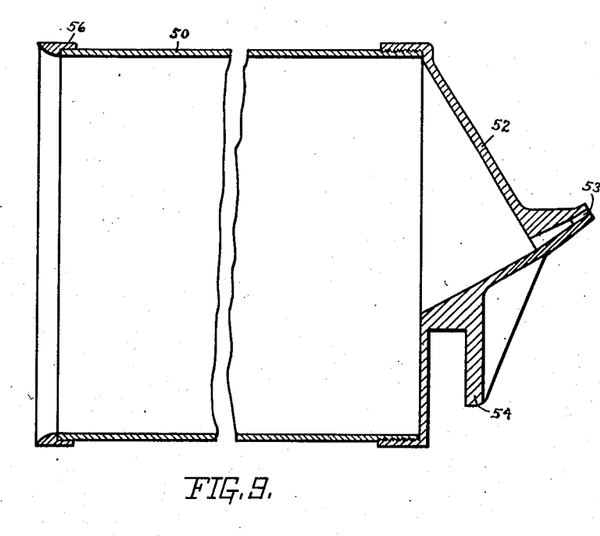
Fig. 9 is a section on the line 9—9 of Fig. 8.
Figure 10:
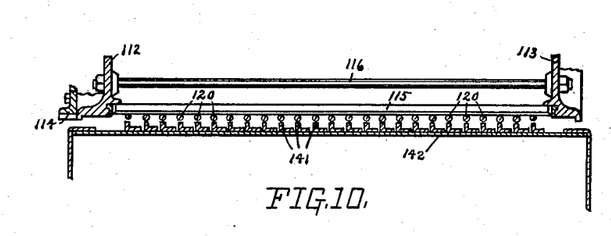
Fig. 10 is a section on the line 10—10 of Fig. 6.

Extending across between the longitudinal members 11 and 13 are the angle-bar 48 and the saddle bar 49 which support the cylinders 50. See Fig. 5. In Figs. 8 and 9 these cylinders are shown to have ends 52 provided with perforations 53, and flanges 54 to extend down over the rear face of the angle-bar 48. A pivoted bar 55 is adapted to swing to vertical position over the rings 56 at the open ends of these cylinders. See Figs. 1 and 5.

Figure 2:
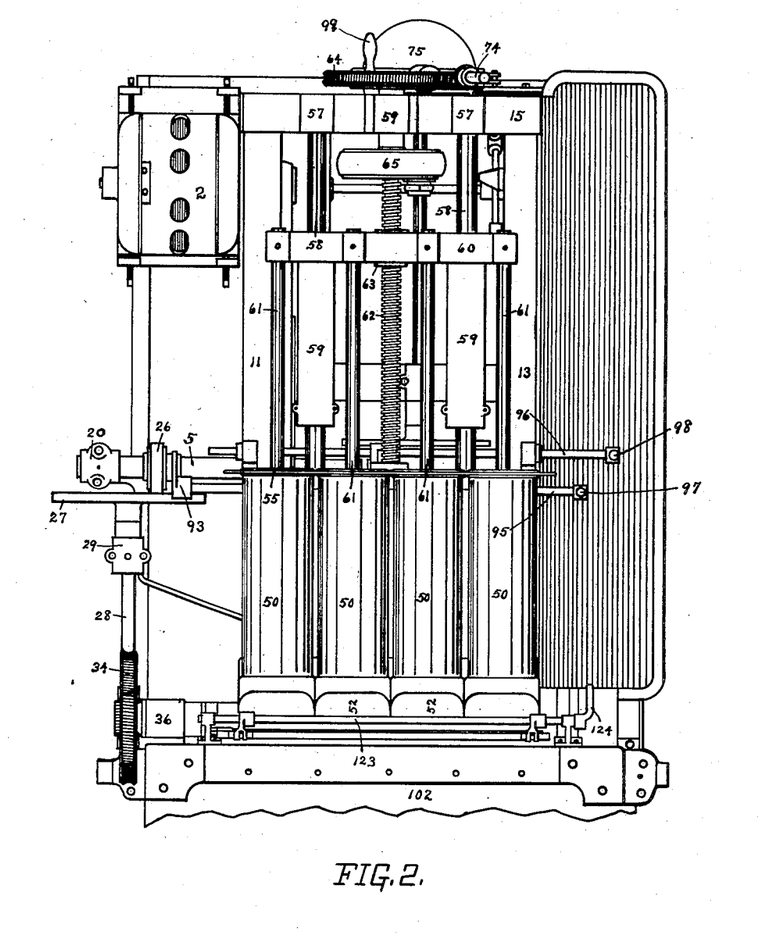
Fig. 2 is a plan of the cylinders and of the driving mechanism.

Mounted on the cross-bars 15 and 48 are the bearings 57 for the stationary guide bars 58 and the bearing 59 for the screw 62. The rear end of the screw may be journaled in the saddle bar 49. The guide bars 58 carry the shoes 59, best seen in Figs. 1 and 2, to which is secured the cross-head 60. This cross-head carries the ends of the piston rods 61 and the nut 63 for the screw 62. The screw has a worm wheel 64 on its front end and a pulley 65 to receive the belt 66 that also runs on the pulley 40 on the shaft 39. The worm wheel turns the screw to force the piston rods 61 into the cylinders and the pulley turns the screw in the opposite direction to withdraw the piston rods.

Figure 5:
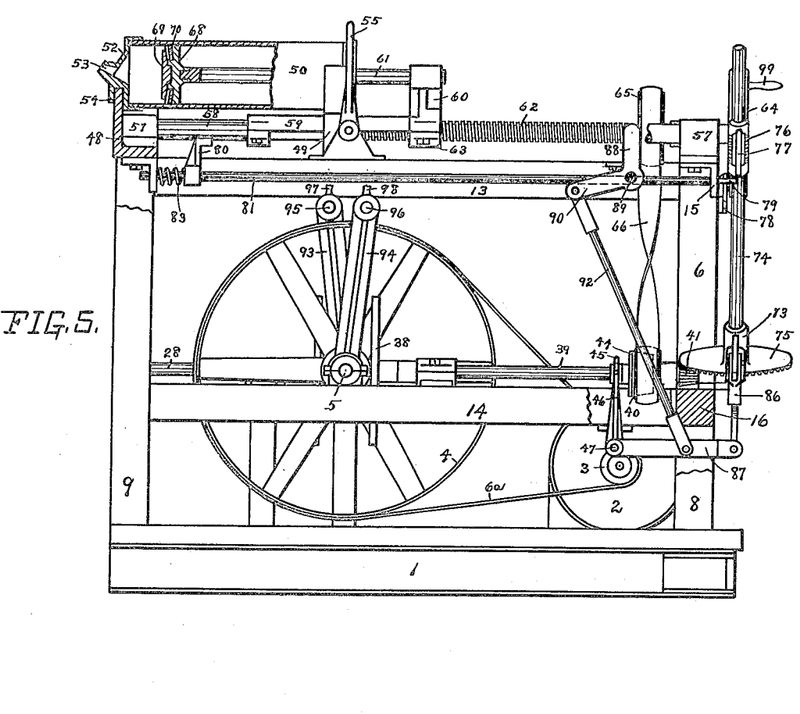
Fig. 5 is a left side elevation of the front part of the machine.

While the pistons may be of any desired construction, that shown in Fig. 5 is preferred, consisting of a piston 68, a disk 69 and a washer 70.

Figure 4:
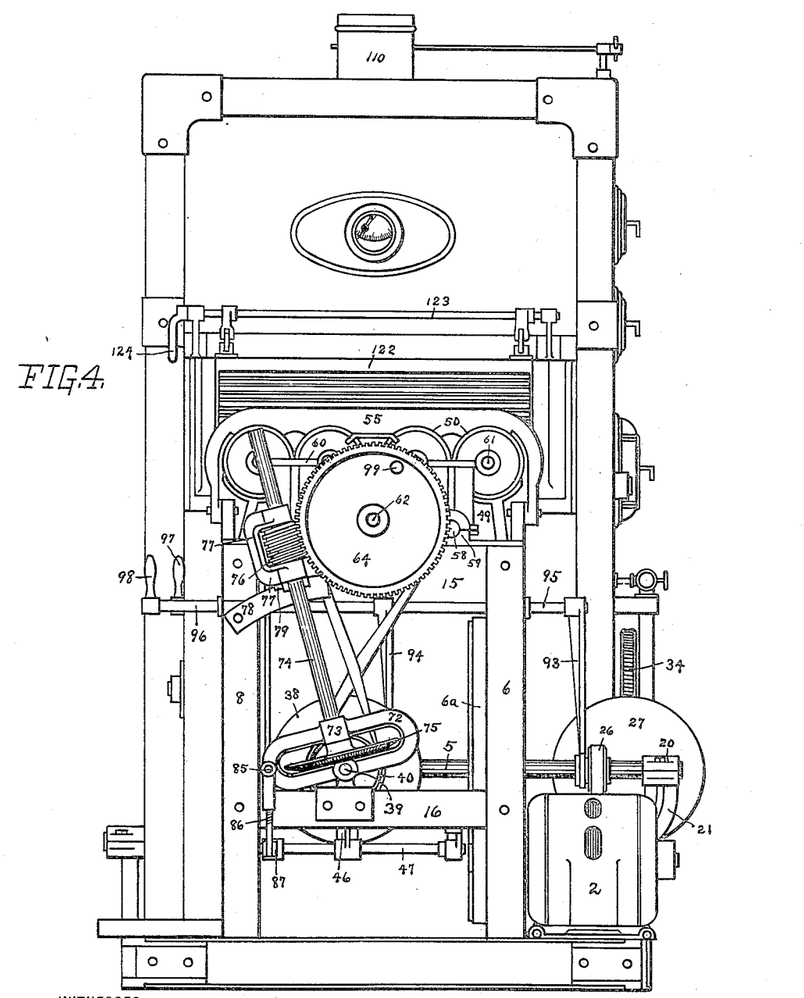
Fig. 4 is an end elevation of the machine.

As stated before, the worm-wheel 64 turns the screw 62 to force the pistons into the cylinders, and the pulley 65 turns the screw in the opposite direction. The mechanism connecting the worm-wheel and pulley to the shaft 39 and for controlling these operations is as follows. Pivotally mounted on the front end of the shaft 39, as shown in Fig. 4, is a yoke 72, which has a bearing 73 for the shaft 74. On this shaft are secured the bevel gear 75 and the worm 76, while a yoke 77 is mounted on the shaft and positioned by the worm which is adapted to mesh with the worm-wheel 64 on the screw 62.

Mounted on the upright 8 is a curved guide 78 which has a notch to receive the finger 79 that may hold the yoke 77 and the shaft 74 in such position that the worm 76 engages the wheel 64, during which time the pistons 68 will be moved toward the heads 52 of the cylinders 50. When the end of their stroke is reached, one of the slippers 59 (Fig. 5) will engage an arm 80 on the slidable rod 81, and move it toward the rear against the tension of the spring 83. The finger 79 is on the front end of the rod 81, and the rearward movement of the finger releases the shaft 74, permitting it to swing to the left (in Fig. 4) and the worm 76 to disengage the worm-wheel 64. This immediately stops the screw.

On the yoke 72 is a pin 85 and a link 86 extends from this pin to the end of the lever 87 (Fig. 5) mounted on the shaft 47 that carries the lever 46. Therefore, when the shaft 74 swings over laterally and disengages the worm 76 and the wheel 64, it swings down the lever 87 and forces the clutch-cone 44 into the pulley 40, causing it to revolve with the shaft 39, and thereby drive the pulley 65 on the screw 62 by means of the belt 66. This turns back the screw and moves the cross-head 60, the slippers 59 and the pistons forward.

When the forward limit of the movement of the cross-head 60 is reached, it will engage the arm 88 of a bell-crank lever mounted on the pin 89 carried by the side bar 13. The other arm 90 of this bell-crank connects to the lever 87 by means of a link 92. Swinging back the arm 88 will swing up the arm 87 and disengage the clutch-cone 44 from the pulley 40 and thus stop the screw. This will be at a time when the pressure of the cross-head against this arm 88 is sufficient to support the shaft 74. When this occurs, the cylinders 50 are removed and refilled, but preferably other cylinders, already filled, are substituted. The dough which is especially prepared for the purpose issues from the holes 53 under pressure of the pistons in the form of pencils or rods, all parallel to each other, and are received by a proper movable carrier within the oven and are there baked. The speed of the pistons and of the carrier may be regulated by moving the friction wheels 25 and 26 across their respective disks 38 and 27 by means of the arms 93 and 94 which are connected to the transversely slidable rods 95 and 96, to which the operating handles 97 and 98 are connected. A handle 99 may be mounted on the wheel 64 in order to adjust the pistons before the worm 76 is swung against the wheel 64.

The oven shown in the drawings is shown with sides 100 and 101, top 102, back 103, and the upper part 104 and the lower part 105 of the front, all preferably constructed of two sheets of metal with some good insulator between them. Burner pipes for gas 106 extend across through the oven and may be supplied by the feed pipes 107 and controlled by the valves 108. Doors 109 permit inspection of the interior. A small stack 110 with a damper 111 permits the escape of burnt gases.

The carrier for the pencils of dough may be of any desired construction, but is preferably in the form of a drum composed of two rings 112 and 113, the latter supplied with a ring of teeth 114 which mesh with the pinion 37 on the shaft 35, whereby the carrier is revolved. Between the two rings the blades 115 are held by means of the bolts 116. The rings 112 and 113 rest on rolls 117, mounted in pairs on the shafts 118, which are mounted in bearings 119 on the outside of the oven, shown in Fig. 1. The pencils 120 of the dough are ejected from the passages 53 in an upward direction onto the carrier, where these pencils will rest on the sharp outer edges of these blades 115 and be indented thereby, so that after they are baked, they will readily break at these points. The space where these pencils of dough enter the oven may be nearly closed by means of a door 122, mounted on a shaft 123 and operable by the handles 124.

Figure 6:
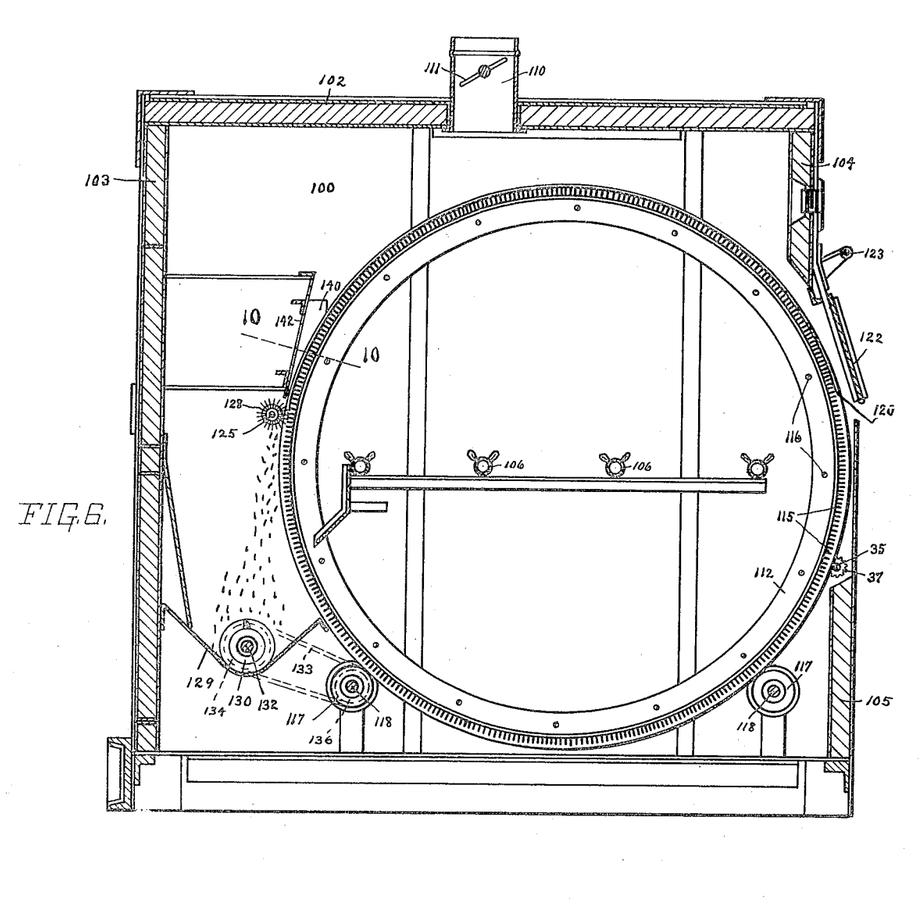
Fig. 6 is a longitudinal section of the oven.
Figure 7:
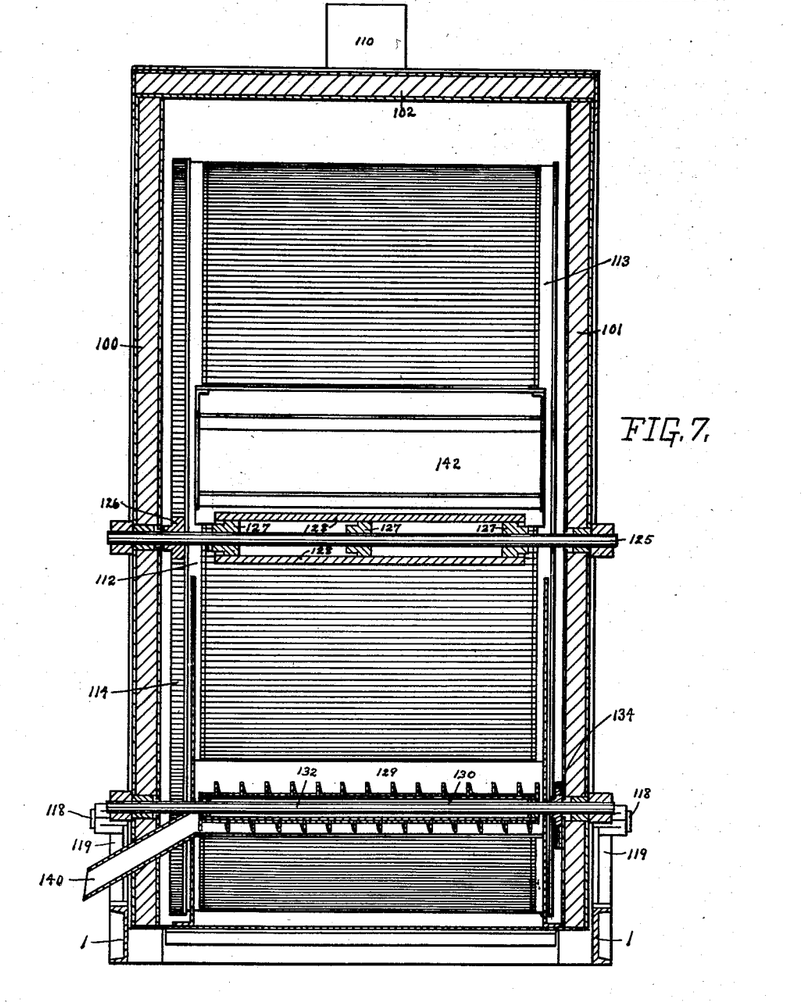
Fig. 7 is a transverse section of the oven, on the line 7—7 of Fig. 1.

A small shaft 125 extends across the oven, as shown in Figs. 6 and 7, and has a pinion 126 secured to it which meshes with the ring of teeth 114 of the dough carrier. On the shaft are mounted the collars 127 which are slotted radially and longitudinally to hold the narrow blades 128 which form a breaking roll of such diameter that the blades 128 will just enter the spaces between the blades 115 and therefore break the pencils of dough resting on the carrier, both at the blades 115 and between them, so that these pieces will fall into a trough 129 in the rear of the oven.

In the trough 129 is a screw conveyer 130 on the shaft 132, mounted in bearings 133 and carrying a sprocket wheel 134 shown in section in Fig. 7 and indicated in dotted lines in Fig. 6. A driving chain 135 may connect this wheel to a similar wheel 136 on the rear shaft 118. The spout 140 extends through the side of the oven from the trough. Guide plates 141 on the guard plate 142 prevent the pencils of dough from swinging out of place on the carrier just before being broken up.

While the preferred form of dough carrier, pencil forming means, oven, and driving mechanism have been shown, the skilled designer is not restricted to their details but may change them as may be found necessary and desirable without departing from the spirit of my invention as set forth in the claims.

I claim.

1. In a machine for forming and baking farinaceous food, the combination of an oven, means to heat the same, a carrier therein comprising a pair of revoluble rings and blades extending between them and having sharp edges, and means for forming pencils of dough and placing them on the edges of the blades of said carrier.

2. In a machine for forming and baking farinaceous food, the combination of an oven and means to heat the same, a cylindrical drum formed of longitudinal blades placed with their sides radial and having their outer edges sharp, and means for discharging pencils of dough onto said drum.

3. In a machine for forming and baking farinaceous food, the combination of an oven, means to heat the same, a carrier therein comprising a pair of revoluble rings and blades extending between them and having sharp edges, means for forming pencils of dough and placing them on the edges of the blades of said carrier, and means to break said pencils into short pieces.

4. In a machine for forming and baking farinaceous food, the combination of an oven and means to heat the same, a cylindrical drum formed of longitudinal blades placed with their sides radial and having their outer edges sharp, means for discharging pencils of dough onto said drum, and means to break said pencils into short pieces.

5. In a machine for forming and baking farinaceous food, the combination of an oven, means to heat the same, a carrier therein comprising a pair of revoluble rings and blades extending between them and having sharp edges, means for forming pencils of dough and placing them on the edges of the blades of said carrier, means to break said pencils into short lengths comprising a drum having longitudinal blades to engage the pencils between the blades of the carrier, and mechanism to revolve the carrier and drum.

6. In a machine for forming and baking farinaceous food, the combination of an oven and means to heat the same, a cylindrical drum formed of longitudinal blades placed with their sides radial and having their outer edges sharp, means for discharging pencils of dough onto said drum, and means to break said pencils into short lengths comprising a small drum having longitudinal blades to engage the pencils between the blades of the large drum.

7. In a machine for forming and baking plastic material, the combination with an oven and means to heat the same, a carrier in the oven, said carrier having its carrying surface formed of a series of parallel upstanding members, spaced from each other, means for discharging pencils of plastic material upon the carrier and means for breaking the pencils into short lengths, said means comprising a series of parallel spaced members that are adapted to enter into the spaces between the parallel upstanding members on the carrier.

8. In a machine for forming and baking plastic material, the combination with an oven and means to heat the same, a carrier in the oven, said carrier having its carrying surface formed of a series of parallel upstanding members spaced from each other and arranged at right angles to the line of movement of the carrier, means for discharging pencils of plastic material in a line parallel to the line of movement of the carrier, and means for breaking the baked pencils into short lengths, said means comprising a series of parallel spaced members that are respectively adapted to enter into the spaces between the parallel upstanding members on the carrier.

9. In a machine for forming and baking plastic material, the combination with an oven and means to heat the same, a carrier in the oven, said carrier having its carrying surface formed of a series of parallel upstanding members, spaced from each other, means for discharging pencils of plastic material upon the carrier in a direction at right angles to the upstanding members, means for breaking the baked pencils, said means comprising a series of movable parallel spaced members that are adapted to enter into the spaces between the parallel upstanding members on the carrier.

10. In a machine for forming and baking plastic material, the combination with an oven and means to heat the same, a carrier in the oven, said carrier having its carrying surface formed of a series of parallel upstanding members, spaced from each other, means for discharging pencils of plastic material upon the carrier in a direction at right angles to the upstanding members, means for breaking the baked pencils, said means comprising a rotatable drum having longitudinal blades that are adapted to enter into the spaces between the parallel upstanding members on the carrier.

11. In a machine for forming and baking plastic food material, the combination with an oven and means to heat the same, a carrier in said oven provided with a series of parallel blades mounted transversely to the moving surface of the carrier, means to constantly drive said carrier, means to vary the speed of the carrier, means to discharge pencils of the plastic material upon the blades in such a manner that the pencils will sag between the blades and be baked in such form, and means to receive the broken pencils as they drop from the carrier.

12. In a device for forming and baking food products, the combination of an oven and means to heat the same, a cylindrical drum formed of longitudinal blades radially placed and having their outer edges sharp and a pair of rings to sustain the ends of said blades, one of said rings being formed with gear teeth, rollers to support said rings, means to revolve said drum, means for discharging pencils of dough onto said drum, means to break said pencils into short lengths comprising a drum of relatively small diameter having longitudinal blades to engage the pencils of dough between the blades of the large drum, and a gear on the small drum meshing with the gear teeth of the large drum to revolve the small drum.

13. In a device for forming and baking plastic material, the combination of a movable carrier, an oven surrounding the same and means to heat the oven, a cylinder adjacent the oven and having a discharge end adjacent the carrier, a piston in the cylinder, a screw to move the piston, mechanism to rotate the screw, said mechanism comprising a driving shaft having a bevel gear thereon, a yoke pivotally mounted on the shaft, a second shaft carried by the yoke, a bevel gear thereon meshing with the first-mentioned bevel gear, a worm on the second shaft, a worm gear adapted to rotate the screw, a second yoke upon the second shaft, a guide for the yoke, said guide having an opening therein, a member projecting through the opening to hold the worm in engagement with the worm wheel, and means moving with the piston for contacting with the member and withdrawing it to allow the yoke to move along the guide at the termination of the forward stroke of the piston, thereby disengaging the worm from the worm wheel.

14. In a device for forming and baking plastic material, the combination of a movable carrier, an oven surrounding the same and means to heat the oven, a cylinder adjacent the oven and having a discharge end adjacent the carrier, a piston in the cylinder, a screw to move the piston, mechanism to rotate the screw in one direction, said mechanism comprising a driving shaft having a bevel gear thereon, a yoke pivotally mounted on the shaft, a second shaft carried by the yoke, a bevel gear thereon meshing with the first-mentioned bevel gear, a worm on the second shaft, a worm gear adapted to rotate the screw, and means for holding the worm in engagement with the worm gear throughout the forward stroke of the piston, means for releasing the worm from engagement with the worm gear at the termination of the forward stroke, means for rotating the screw in the opposite direction to move the piston rearwardly, and means connected to the yoke for automatically throwing said last-mentioned means into operation at the termination of the forward stroke.

In testimony whereof I have signed this specification in the presence of two subscribing witnesses.

CLAUS O. BRANDELL.

Witnesses:
MENTOR WETZSTEIN,
L. E. BURRIDGE.